United States Patent Office 3,384,661
Patented May 21, 1968

3,384,661
ALCOHOLATES OF BIS(p-AMINOCYCLOHEXYL)
METHANE AND THEIR USE IN SEPARATING
STEREOISOMERS OF BIS(p-AMINOCYCLOHEX-
YL)METHANE
Wilfred J. Arthur, Charleston, W. Va., assignor to E. I. du Pont de Nemours and Company, Wilmington, Del., a corporation of Delaware
No Drawing. Filed Dec. 28, 1964, Ser. No. 421,642
14 Claims. (Cl. 260—563)

ABSTRACT OF THE DISCLOSURE

Alcoholates of bis(p-aminocyclohexyl)methane and cycloaliphatic alcohols such as cyclohexanol are prepared by admixing the two components in the presence or absence of an inert organic diluent such as cyclohexane. The alcoholates are useful in separating the stereoisomers of bis(p-aminocyclohexyl)methane as the alcoholates of the stereoisomers have different solubilities one from the other and different solubilities than the stereoisomers themselves.

Description of the invention

This invention relates to bis(p-aminocyclohexyl)methane. More particularly it is directed to the bis(p-aminocyclohexyl)methane alcoholates of the following formula (1)

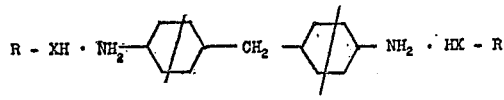

wherein:

X is oxygen or sulfur; and
R is a compound of the following fromulae (2)

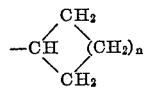

and (3)

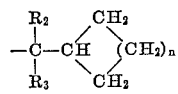

wherein:

$n$ is a positive integer of from 1 to 9;
$R_2$ is hydrogen or alkyl of 1 to 5 carbons; and
$R_3$ is hydrogen or alkyl of 1 to 5 carbons;

with the limitation that there be no more than a total of 25 carbons in R.

Bis(p-aminocyclohexyl)methane, hereinafter referred to as PACM, is known to exist in three stereoisomeric forms. These stereoisomers exist because of the relative configuration of the two pendant amine groups and the methylene group bridging the two cyclohexyl moieties. The three stereoisomers are designated by common terminology the cis,cis, the cis, trans, and the trans,trans isomers.

As is often true of stereoisomers, these isomers sometimes differ in physical properties such as melting points. In order to obtain a particularly desired property it is often necessary to separate the stereoisomers or at least to concentrate one or more isomers at the expense of the concentration of the other isomers or isomer.

Various techniques are known for isolating or enriching the stereoisomers of PACM. Kirk et al., U.S. Patent No. 2,494,563 describes several techniques such as crystallization from solvents, preparation and isolation of derivatives and fractional crystallization in the absence of a solvent.

Direct crystallization, with or without a solvent, is disadvantageous in that the solubility of the three isomers is similar and crystallization is difficult to achieve. A high degree of concentration of one isomer may require many recrystallizations. The formation of chemical derivatives gives a more positive crystallization scheme but has the disadvantage of usually requiring at least one reaction step and one or more subsequent chemical steps to regenerate the diamine after separation.

I have discovered that PACM coordinates with cycloaliphatic compounds of the following formula to form what I call an alcoholate:

(4)          HX—R wherein:

X is oxygen or sulfur; and
R is a compound of the following formulae (2)

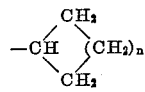

and (3)

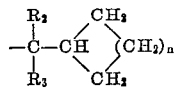

wherein:

$n$ is a positive integer of from 1 to 9;
$R_2$ is hydrogen or alkyl of 1 to 5 carbons; and
$R_3$ is hydrogen or alkyl of 1 to 5 carbons;

with the limitation that there be no more than a total of 25 carbon atoms in R.

It is to be understood that the R in the above formula, while illustrated as being saturated and unsubstituted is meant to include as well the unsaturated groups and both the saturated and unsaturated groups containing any subsitutents which will not interfere with coordination of the HX—R molecule with the PACM molecule.

Stated differently the R of the above formula is meant to include unsaturated groups and all substituents which are less reactive with PACM than the OH or SH group.

The term alcoholate as used to describe the products of this invention means a compound of Formula 4 in association with PACM by means of coordinate covalent bonds such as is commonly known in the chemistry of hydrates. The molecule of PACM and the molecule of the compound of Formula 4 are coordinated in a manner siimlar to water of hydration, with the compound of Formula 4 corresponding to the water.

While the exact formation and chemical structure of these compounds is not completely understood their existence is readily ascertainable as will be more fully exemplified hereinafter.

These alcoholates are extremely useful in separating the stereoisomers of PACM. The alcoholates have different solubilities one from the other and markedly different solubilities than the stereoisomers of PACM themselves. By converting a stereoisomer fraction such as the trans,trans isomer fraction to the corresponding alcoholate in a mixture of PACM stereoisomers a crystallization is easily obtained which permits the separation of the trans, trans stereoisomer from the other two isomers. Using this method a mixture of the stereoisomers of PACM can be reduced in trans,trans isomer content to 10% or lower.

Additionally, the alcoholate can, if desired, be decomposed back into its component parts such as cyclohexanol and trans,trans PACM by simply subjecting the alcoholate to fractional distillation under either atmospheric or reduced pressure. Under these conditions the cyclohexanol will boil off at its pure component point and the diamine at its pure component point. This technique, utilizing the alcoholates of this invention, provides an easy, effective and inexpensive method for separating or concentrating the isomers of PACM.

Starting materials

The PACM starting material can be prepared by any suitable means. Satisfactory methods are described, for example, in Kirk et al. U.S. Patent No. 2,944,563 issued Jan. 17, 1950; Whitman, U.S. Patent No. 2,606,925 issued Aug 12, 1952; and Barkdoll et al., U.S. Patent No. 2,606,928 issued Aug. 12, 1952.

Suitable alcohols and thiols of Formula 4 can be obtained commercially or can be prepared by methods well known to the art. For example, the alicyclic alcohols can be prepared by catalytic hydrogenation of the corresponding ketones, the alicyclic carbinols can be prepared by the Bouveault-Blanc reduction of the corresponding esters, and the thiols can be prepared by treating the corresponding halides with potassium hydrogen sulfide.

Alcohols of Formula 4 which have been found particularly satisfactory in forming readily separable alcoholates with the trans,trans isomer of PACM are as follows: cyclobutanol, cyclopentanol, cyclohexanol, cycloheptanol, cyclooctanol, cyclononanol, cyclodecanol, cycloundecanol, cyclododecanol, 2 - methyl-cyclohexanol, cyclobutylmethanol, cyclopentylmethanol, 1-(cyclohexyl)ethanol, cyclohexylmethanol, cycloheptylmethanol, cyclooctylmethanol, cyclononylmethanol, cyclodecylmethanol, cycloundecylmethanol, cyclododecylmethanol, 2-(cyclohexyl)butanol-2, 3-(cyclooctyl)hexanol-3, 2-methyl-cyclopentanol, 4-isopropylcyclohexanol and 2-methoxycyclohexanol.

Thiols which have been found satisfactory in forming separable alcoholates with the trans,trans isomer of PACM include cyclopentanethiol, cyclohexanethiol cycloheptanethiol and cyclohexylmethanethiol.

Reaction conditions

The preparation of the alcoholates and subsequent separation of alcoholates from remaining stereoisomers can conveniently be accomplished as will now be described.

The preparation of the alcoholate is accomplished by bringing together in a suitable vessel a quantity of PACM with a stoichiometric amount of one of the previously described compounds of Formula 4. Mixing of the reactants results in the formation of the alcoholates.

The reaction is mildly exothermic and reaction temperatures are not critical. If the reaction is conducted at atmospheric pressure, it is desirable to maintain a temperature above the freezing point of thet reactants and below their normal boiling points. To avoid necessity for costly equipment the reaction will preferably be carried out between about −25° C. and 100° C., and for ease of handling the reaction will most preferably be conducted between 15° and 75° C.

The amount of alcohol or thiol used is not critical but will be determined by the results sought to be obtained. Ordinarily two moles of alcohol or thiol will be used for each mole of PACM with which reaction is desired. For example, if a mixture of the three isomers is to be separated with a compound of Formula 4 by forming an alcoholate of the trans,trans isomer, the compound of Formula 4 will be used in amounts slightly in excess of that which is sufficient to combine with the trans,trans isomer.

Amounts of alcohol or thiol in excess of stoichiometric ordinarily create no problem other than removal of the excess reactant at the completion of the reaction. Amounts which are less than stoichiometric merely result in some PACM remaining after completion of the reaction.

When a mixture of PACM isomers is used the alcohol or thiol will ordinarily combine on a preferential basis with the trans,trans isomer. Any subsequent combination of alcohol or thiol with the PACM isomers is probably in the order of first with the cis,cis isomer and then with the cis,trans isomer. If a mixture of the PACM isomer alcoholates is formed their separation is ordinarily on the same order with the trans,trans isomer alcoholate crystallizing first.

The crystallization of the alcoholates is accomplished by methods well known in the art, with simple cooling, agitation or sending being used as desirable.

Separation of the crystallized alcoholate can also be accomplished by methods well known in the art, such as filtration, centrifugation, or concentration by decantation.

If desired, the reaction can be conducted in the presence of an inert organic diluent. It appears that most of the trans,trans isomer alcoholate which is formed during the reaction is dissolved therein in the other PACM isomers or their alcoholates. Addition of an inert organic diluent can therefore be used to advantage by decreasing the solubility of an alcoholate, such as the trans,trans isomer alcoholate, in the other PACM isomers or their alcoholates.

A diluent if used can be admixed with the other reactants in any order. The amount of diluent used can range from trace amounts up to many times the volume of the other reactants. For reasons of convenience and economy the diluent will normally be used in amounts ranging from about 1 to 5 times the volume of the PACM used, with the optimum recoveries obtainable at amounts of about 3 times the volume of PACM used.

In view of its purpose the diluent should be selected on the basis that the reactants dissolve in it while the alcoholate reaction product is readily separable from it such as by crystallization of the alcoholate followed by filtration, centrifugation or decantation. It is also desirable that the diluent be one which can be removed by distillation or evaporation.

As will be obvious to one skilled in the art the choice of such a diluent would also be made on the basis that it is non-reactive with the starting materials or the alcoholates being formed. For example, such classes of compounds as organic acids, aldehydes or ketones and organics containing active halogens are not considered "inert" organic diluents for the purposes of this invention. Classes of compounds which have been found valuable as inert diluents include ethers, aromatic hydrocarbons, straight and branch-chained aliphatic hydrocarbons, nitriles, ketals, aliphatic amines and stable chlorine containing hydrocarbons. Combinations of such inert diluents can also be used if desired.

One skilled in the art will further recognize that the choice of a particular diluent is in part a function of the alcohol or thiol to be used. And, while general rules regarding the solubility of like materials in like solvents and the converse exist, perfect theoretical criteria for the optimum choice of solvents in crystallization have not as yet been devised. As a result it is generally recognized that the choice of an optimum solvent is always a matter of trial and error experimentation and much the same is true of the inert organic diluents to be used in this invention.

Particular diluents which have been found useful are those such as di-n-butyl ether, diisopropyl ether, cyclohexane, toluene, di-n-propyl ether, diallyl ether, xylene, n-hexane, cyclooctane, tributylamine, isopropoxypropionitrile, tetrahydrofuran, tetrahyropyran, diethyl ether, tetramethylene sulfone, 2 - methyl - 5 - ethylpyridine, isobutylamine, diisopropylamine, hexahydroazepine, isooctane, dicyclohexylmethane, nitromethane, adiponitrile, acetonitrile, dioxane, 1,2-diethoxyethane, 1,2-dimethoxyethane, dicyclohexyl ether, n-heptane, n-octane, n-tetradecane, undecane, myristyl chloride and 2,3,4-trimethyl-1,5-dioxaspiro(5.5)undecane.

Of these diluents, di-n-propyl ether, diallyl ether, di-n-butyl ether, xylene, diisopropyl ether, cyclooctane, toluene, 1,2-diethoxyethane, n-octane, n-heptane, n-hexane, acetonitrile, cyclohexane, and tributylamine are preferred because of the marked improvement their presence contributes to the crystallization of the alcoholates.

The most preferred diluents because of their ease of handling and highest alcoholate recoveries are n-octane, n-heptane, n-hexane, acetonitrile and cyclohexane.

Generally speaking, the selection of the alcohol or thiol to be used in forming the alcoholates of this invention is similar to the selection of a diluent. As previously mentioned, the alcohol or thiol should contain no substituent group which is more reactive with PACM than the OH or SH group of the alcohol or thiol. The alcohol or thiol is chosen on the basis of the melting point of the alcoholate it will form and the advantages attendant to a good crystal habit of that alcoholate.

The melting point and crystal habit of the alcoholate to a large measure determine the ease and effectiveness of recovery of that alcoholate by crystallization and filtration, centrifugation or decantation.

Generally the cyclopentanol, cyclohexanol, cycloheptanol, cyclopentylmethanol, 1-(cyclohexyl)ethanol, cyclohexylmethanol, 2-methyl-cyclohexanol, cyclodecanol and cyclododecanol are preferred because the solubilities of their alcoholates in either the remaining unalcoholated PACM stereoisomers or the remaining unalcoholated PACM stereoisomers plus the diluent if used, is low and their crystal habit is such as to give a firm, more easily filterable crystal.

The most preferred alcohols are cyclopentanol, cycloheptanol, 2-methyl-cyclohexanol, cyclohexanol and cyclohexylmethanol. These alcohols convert the trans,trans isomer of PACM to the insoluble alcoholate in the highest yields, crystallize most readily and are most easily separated.

Reaction products

As has been stated previously, the formation and chemical structure of the alcoholates of this invention are not completely understood. However, that the alcoholates exist as new chemical entities, distanct from the reactants, can be demonstrated.

For example, I have found that whereas cyclohexanol is a liquid above 25° C. and the trans,trans isomer of PACM melts at 64.5° C., a combination of two moles of alcohol and one mole of trans,trans PACM gives a solid which melts at 74.5° C. The melting point is sharp and distinct as is characteristic of a chemical entity. The presence of more than a stoichiometric amount of cyclohexanol or trans,trans PACM in the preparation of this alcoholate results in a melting point lowering as would be expected of a mixture of two organic compounds. Similar melting point differences can be shown in the formation of the trans,trans PACM-cyclopentanolate which melts at 40° C., the trans,trans PACM-cyclohexylmethanolate which melts at 73° C., the trans,trans PACM-cycloheptanolate which melts at 70° C., the trans,trans PACM-cyclooctanolate which melts at 67° C., and many others.

Moreover, the alcoholates of trans,trans PACM, are further demonstrated to be molecular entities through their Nuclear Magnetic Resonance spectra. The NMR indicates the formation of coordinate covalent bonding through the OH or SH groups as previously described, similar to the formation of hydrates.

X-ray examination of the alcoholate crystals reflect the following strongest peaks in their crystal diffraction pattern in descending order:

| Alcoholate: | Strongest peaks |
|---|---|
| trans,trans PACM - cyclohexanolate. | 5.36A, 6.30A, 5.03A, 2.88A, 2.70A, 5.94A. |
| trans,trans PACM - cyclopentanolate. | 4.67A, 5.20A, 5.55A, 4.41A. |
| trans,trans PACM - cyclohexylmethanolate. | 5.12A, 5.39A, 6.09A, 4.82A. |
| trans,trans PACM - cyclooctanolate. | 5.24A, 2.49A, 6.15A, 5.57A. |
| trans,trans PACM - cycloheptanolate. | 5.24A, 5.43A, 6.10A, 6.37A. |

These examples as well as those that follow are for the purpose of further exemplifying the invention and should not be construed as in any way limiting the invention. The parts and percentages are by weight unless otherwise noted.

Example 1

In a suitable container equipped for mixing of the contents is placed 300 parts of di-n-butyl ether and 100 parts of PACM having a freezing point of 23° C. and consisting of 30% trans,trans, 59% cis,trans and 11% cis,cis isomers. While stirring, 40 parts of cyclohexanol is added and the mixture is cooled to about 15° C. before making a separation of the solid and liquid via simple filtration. Each phase is fractionally distilled separately to remove ether and cyclohexanol, and, finally, to take overhead a fraction of PACM boiling at about 150° C. at 3 torr. That PACM obtained from the filtrate shows a freezing point of about 18° C. and contains 26% trans,trans, 60% cis,trans and 14% cis,cis isomers. That PACM obtained from the separated crystal crop has a freezing point of 42.5° C. and contains 51% trans,trans, 41% cis,trans, and 8% cis,cis isomers.

Example 2

In a container equipped for heating or cooling and arranged for stirring of the contents is placed 300 parts of dibutyl ether and 100 parts of PACM consisting of 30% trans,trans, 59% cis,trans, and 11% cis,cis isomers. With stirring and at a temperature of 30° C., 10 parts of cyclopentanol is added, and the mixture is then cooled slowly to 10° C. The small crystal crop is removed by simple filtration and is fractionally distilled to recover the contained PACM. After removal of the ether and cyclopentanol the crystal crop is found to consist of PACM containing 73% trans,trans, 22% cis,trans, and 5% cis,cis isomer.

Example 3

In a suitable vessel equipped with an agitator is placed 350 parts of n-heptane and 100 parts of PACM consisting of about 30% trans,trans, 59% cis,trans, and 11% cis,cis isomers. At about 30° C. and with agitation, 50 parts of cyclohexanol is added and the mixture is cooled to 15° C. where it is held for about 45 minutes. The bulky crystalline solids obtained are separated from the mother liquor by simple filtration at 15° C. and are rinsed with 25 parts of n-heptane prior to the distillation with yields 27 parts of PACM comprised of 72% trans,trans, 24% cis,trans and 4% cis,cis isomers. The filtrate is distilled to remove n-heptane and to recover 76 parts of PACM containing 14% trans,trans, 70% cis,trans and 16% cis,cis.

Example 4

Approximately 40 parts of cycloheptanol is injected into a mixture of 125 parts of cyclohexane and 50 parts of PACM containing about 29% trans,trans isomer in admixture with the other isomers, at 30° C. The mixture is cooled with stirring and is held at about 7° C. for 30 minutes prior to phase separation via simple filtration. The crystal cake is rinsed with about 15 parts of cyclohexane prior to distillation. In addition to a small amount of solvent and 11 parts of cycloheptanol which can be recycled to the process there is obtained a PACM fraction of 13 parts containing 72% trans,trans in admixture with the other isomers.

Example 5

A mixture of 225 parts of n-hexane and 50 parts of PACM containing about 30% trans,trans mixed with the other isomers is treated with 30 parts of cyclodecanol and the nearly gelled mass is held at 22° C. for 15 minutes prior to simple filtration separation of the solid crystalline phase from the supernatant liquid. Distillation of the crystal crop gives n-hexane, cyclododecanol and 10 parts of a "Hearts Cut" of PACM containing 57% trans,trans isomer mixed with the other isomers.

Example 6

A mixture of 350 parts of cyclohexane and 100 parts of PACM consisting of 55% trans,trans, 37% cis,trans, and 8% cis,cis isomers, is treated with 40 parts of 2-methylcyclohexanol at about 32° C., and is stirred and cooled to 17° C. in about 30 minutes. The resulting slurry is filtered to obtain about 104 parts of wet crystal cake. These wet solids are distilled to give cyclohexane, 14 parts of 2-methylcyclohexanol and 28 parts of PACM comprised of 72% trans,trans, 23% cis,trans, and 5% cis,cis isomers. The filtrate is distilled to yield a PACM fraction comprised of 53% trans,trans, 39% cis,trans and 8% cis,cis isomers.

Example 7

A mixture of 250 parts of n-hexane and 100 parts of PACM comprised of 29% trans,trans, 60% cis,trans and 11% cis,cis isomers is treated with 50 parts of cyclohexylmethanol at 30° C. After a short period of cooling, the slurry is found to be too heavy to stir efficiently and the crystallization is done in two steps. A first crop of solid material is removed after cooling to 25° C., and is given a simple displacement rinse with n-hexane. Over a period of about 20 minutes the filtrate is further cooled to about 9° C., at which point the second filtration is made. The crystal cakes are composited and distilled to give 33 parts of cyclohexylmethanol and 49 parts of PACM consisting of 50% trans,trans, 41% cis,trans, and 9% cis,cis isomers.

Example 8

A mixture of 260 parts of n-heptane and 45 parts of PACM having a trans,trans isomer content of 30% is treated with 21 parts of cyclohexylmethanol at about 35° C. The mix begins to crystallize at 31° C. and is cooled slowly with stirring to 25° C. Removal of the bulky crystals by filtration is followed by a further crystallization of the filtrate to about 8° C. over a 30 minute period. The final filtrate is distilled to give n-heptane, 8 parts of cyclohexylmethanol and 28 parts of PACM consisting of 10.9% trans,trans, 72% cis,trans and 17.1% cis,cis isomers.

Example 9

At 35° C., with stirring, 35 parts of cyclohexanol is added to a mixture of 250 parts of n-hexane and 100 parts of a PACM comprised of 29.7% trans,trans, 57.2% cis,trans and 11.9% cis,cis isomers and 1.2% 2,4'-bis(aminocyclohexyl)methane. Upon cooling, crystal nucleation begins at 30° C. and is continued by holding at 6° C. for 25 minutes prior to separation via filtration. The wet cake is rinsed with 20 parts of n-hexane prior to its separation by distillation into n-hexane; 18 parts of cyclohexanol; and 33 parts of PACM comprised of 59.8% trans,trans, 32.9% cis,trans, 6.7% cis,cis isomer and 0.6% 2,4'-bis(aminocyclohexyl)methane. The filtrate is distilled to yield n-hexane, cyclohexanol and 59 parts of a PACM comprised of 14.2% trans,trans, 67.5% cis,trans, and 16.4% cis,cis isomers, and about 0.6% 2,4' - bis(aminocyclohexyl)methane.

Example 10

At 30° C., wtih vigorous stirring, 45 parts of cyclohexanol is added to a mixture of 250 parts of acetonitrile and 100 parts of a PACM comprised of 29.2% trans,trans, 58.6% cis,trans and 11% cis,cis isomers and 1.2% 2,4'-bis(aminocyclohexyl)methane. The mixture is held at 11° C. for 30 minutes before separation via filtration. Distillation shows the crystal cake to contain in addition to acetonitrile and cyclohexanol 29 parts of PACM which is comprised of 51.2% trans,trans, 39.4% cis,trans, and 8.6% cis,cis isomers. The filtrate is distilled to give cyclohexanol, acetonitrile, and 64 parts of a PACM fraction comprised of 17.9% trans,trans, 65.4% cis,trans, and 15.2% cis,cis isomers and 1.5% of 2,4'-bis(aminocyclohexyl)methane.

Example 11

At 35° C. and with continuous stirring 35 parts of cyclohexylmethanol is injected into a mixture of 250 parts of acetonitrile and 100 parts of a PACM comprised of 30% trans,trans, 59% cis,trans and 11% cis,cis isomers. Upon cooling the homogeneous mixture, crystals being to appear at 28° C. and the slurry is further cooled to 10° C. over a total of about 30 minutes. Separation via simple filtration followed by rinsing the crystals with 50 parts of acetonitrile results in a finely powdered crystal cake which is found by fractional distillation at reduced pressure to contain acetonitrile, 16.5 parts of cyclohexylmethylanol, and 20 parts of PACM comprised of 78% trans,trans, 18.4% cis,trans and 3.1% cis,cis isomers. The filtrate was distilled to yield acetonitrile, 17 parts of cyclohexylmethanol and 81 parts of PACM comprised of 17.3% trans,trans, 66.7% cis,trans and 16% cis,cis isomers.

Example 12

At 35° C. and with continuous agitation, 30 parts of cycloheptanol is added to a homogeneous mixture of 250 parts of acetonitrile and 100 parts of a PACM comprised of 29% trans,trans, 58.8% cis,trans and 11% cis,cis isomers and containing 1.2% 2,4'-bis(aminocyclohexyl)methane. The mixture is cooled to 10° C. over a period of about 35 minutes and the phases are separated via simple filtration. A rather light, fluffy cake is obtained after a rinse with 50 parts of acetonitrile and upon fractional distillation at reduced pressure it is found to contain acetonitrile, 9 parts cycloheptanol and 9 parts of a PACM fraction comprised of 85.8% trans,trans, 11.9% cis,trans and 2.1% cis,cis isomers and 0.2% 2,4'-bis(aminocyclohexyl)methane. The filtrate is similarly distilled to show the presence of acetonitrile, 25 parts of cycloheptanol and 86 parts of a PACM fraction comprised of 21.5% trans,trans, 62.8% cis,trans, and 14.4% cis,cis isomers, and 1.3% 2,4'-bis(aminocyclohexyl)methane.

Example 13

At 35° C., 40 parts of commercial 2-methylcyclohexanol is injected into a stirred mixture of 225 parts of n-octane and 100 parts of a PACM comprised of 30% trans,trans, 59% cis,trans, 11% cis,cis isomers. While cooling through the region of 27 C. the mixture is seeded with PACM·2-methylcyclohexanolate and the cooled slurry is held at about 16° C. for 15 minutes prior to simple filtration. The separated phases are individually characterized by vacuum distillation and gas-liquid chromatographic analysis. Other than n-octane and 2-methylcyclohexanol, the crystal cake is shown to contain 20 parts of PACM comprised of 71% trans,trans, 24% cis,trans, and 5% cis,cis isomers. The filtrate is shown to contain-n-octane, 2-methyl-cyclohexanol and 76 parts of a PACM fraction comprised of 22% trans,trans, 64% cis,trans, and 14% cis,cis isomers.

Example 14

At 25° C., 30 parts of cyclohexanethiol is added to a stirred mixture of 120 parts of n-hexane and 56 parts of a PACM comprised of approximately 34% trans,trans, 55% cis,trans and 11% cis,cis isomers. Nucleation is quite slow and the mixture is stirred, cooled and is held at 0–1° C. for about 20 minutes prior to separation of the soft, poorly crystalline solid from the supporting liquid via simple filtration. Upon transfer a 10 part rinse of n-hexane is used. Fourteen parts of wet cake are obtained and are shown to consist of n-hexane, cyclohexanethiol and a PACM moiety comprised of 75% trans,trans, 20% cis,trans and 5% cis,cis isomers.

Example 15

At 35° C., with stirring, 40 parts of cyclooctanol is added to a mixture of 300 parts of dibutyl ether and 100 parts of PACM comprised of 29% trans,trans, 60% cis,trans and 11% cis,cis isomers. Crystal nucleation begins as the temperature drops to 30° C. and is continued by holding at about 7° C. for 75 minutes. Simple filtration serves to separate 75 parts of wet cake from the accompanying mother liquor. Fractional distillation of each phase, individually, shows the crystal cake to contain PACM with an isomer distribution of 46% trans,trans, 45% cis,trans and 9% cis,cis, isomers, and the filtrate to contain ether, cyclooctanol, and 67 parts of PACM comprised of 25% trans,trans, 61% cis,trans and 14% cis,cis isomers.

I claim:

1. The bis(p-aminocyclohexyl)methane alcoholates of the following formula (1)
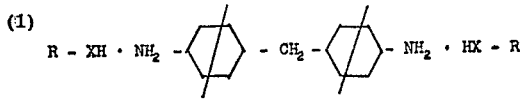

wherein:
X is selected from the group consisting of oxygen and sulfur; and
R is selected from the group represented by the following formulae (2)

and (3)
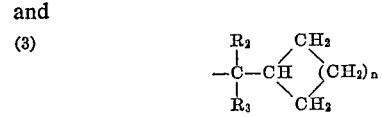

wherein:
$n$ is a positive integer of from 1 to 9;
$R_2$ is selected from the group consisting of hydrogen and alkyl of 1 to 5 carbons; and
$R_3$ is selected from the group consisting of hydrogen and alkyl of 1 to 5 carbons.

2. The trans,trans isomer bis(p-aminocyclohexyl)methane alcoholates of the following formula:

(1)
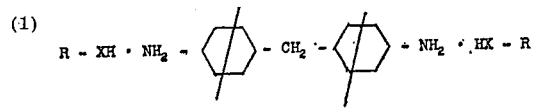

wherein:
X is selected from the group consisting of oxygen and sulfur; and
R is selected from the group represented by the following formulae (2)

and (2)
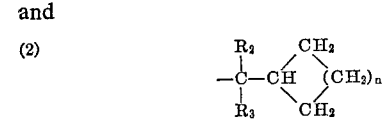

wherein:
$n$ is a positive integer of from 1 to 9;
$R_2$ is selected from the group consisting of hydrogen and alkyl of 1 to 5 carbons; and
$R_3$ is selected from the group consisting of hydrogen and alkyl of 1 to 5 carbons.

3. The alcoholates of bis(p-aminocyclohexyl)methane and an alcohol selected from the group consisting of cyclopentanol, cyclohexanol, cycloheptanol, cyclodecanol, cyclododecanol, cyclopentylmethanol, cyclohexylmethanol, 2-methylcyclohexanol, and 1-(cyclohexyl) ethanol.

4. The alcoholates of the trans, trans isomer of bis(p-aminocyclohexyl)methan and an alcohol selected from the group consisting of cyclopentanol, cyclohexanol, cycloheptanol, cyclodecanol, cyclododecanol, cyclopentylmethanol, cyclohexylmethanol, 2-methylcyclohexanol and 1-(cyclohexyl)ethanol.

5. Bis(p-aminocyclohexyl)methane·cyclohexanolate.

6. Bis(p - aminocyclohexyl)methane·cyclohexylmethanolate.

7. Trans, trans, bis(p-aminocyclohexyl)methane·cyclohexanolate.

8. Trans, trans, bis(p-aminocyclohexyl)methane·cyclohexylmethanolate.

9. The method of separating the stereoisomers of PACM comprising the steps of admixing a mixture of PACM stereoisomers with a compound of the following formula (4)      HX—R

wherein:
X is selected from the group consisting of oxygen and sulfur; and
R is selected from the group represented by the following formulae (2)

and (3)
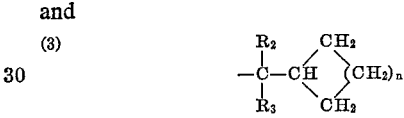

wherein:
$n$ is a positive integer of from 1 to 9;
$R_2$ is selected from the group consisting of hydrogen and alkyl of 1 to 5 carbons; and
$R_3$ is selected from the group consisting of hydrogen and alkyl of 1 to 5 carbons;
separating by physical means the two phases that result; and decomposing the separated phases back to their component parts.

10. The method of separating the streoisomers of PACM comprising the steps of admixing a mixture of PACM stereoisomers with a compound of the following formula (4)      HX—R

wherein:
X is selected from the group consisting of oxygen and sulfur; and
R is selected from the group represented by the following formulae
wherein:

(2)

and (3)

$n$ is a positive integer of from 1 to 9;
$R_2$ is selected from the group consisting of hydrogen and alkyl of 1 to 5 carbon atoms; and
$R_3$ is selected from the group consisting of hydrogen and alkyl of 1 to 5 carbons;
in the presence of an inert organic diluent; separating by physical means the two phases that result; and decomposing the resultant alcoholate back to its component parts; said diluent being one in which the reactants are soluble and from which the alcoholate is readily separable.

11. The process of claim 10 conducted in the presence of a diluent selected from the group consisting of di-n- propyl ether, diallyl ether, di-n-butyl ether, di-isopropyl ether, toluene, xylene, cyclooctane, 1,2-diethoxy-ethane, n-octane, n-heptane, n-hexane, acetonitrile, cyclohexane and tributylamine.

12. The method of claim 11 in which the compound of Formula 4 is selected from the group consisting of cyclopentanol, cyclohexanol, cycloheptanol, cyclohexylmethanol, and 2-methylcyclohexanol.

13. The method of claim 12 in which the compound of Formula 4 is cyclohexanol.

14. The method of claim 12 in which the compound of Formula 4 is cyclohexylmethanol.

References Cited

UNITED STATES PATENTS

| 2,417,809 | 3/1947 | Coleman et al. | 260—567.5 |
| 2,775,591 | 12/1956 | Craig et al. | 260—247.7 |
| 2,821,488 | 1/1958 | Jezl | 860—567.5 X |
| 2,862,022 | 11/1958 | Cook et al. | 260—567.5 X |

OTHER REFERENCES

Freymann: Compt. rend., vol. 225, pp. 261–263 (1937).

FLOYD D. HIGEL, *Primary Examiner.*